United States Patent
Fröhlich et al.

(10) Patent No.: US 7,148,588 B2
(45) Date of Patent: Dec. 12, 2006

(54) PULSE GENERATOR FOR AN ULTRASOUND FLOWMETER

(75) Inventors: Thomas Fröhlich, Basel (CH); Harald Stocker, Schopfheim (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/498,511

(22) PCT Filed: Dec. 18, 2002

(86) PCT No.: PCT/EP02/14442

§ 371 (c)(1),
(2), (4) Date: Feb. 17, 2005

(87) PCT Pub. No.: WO03/054490

PCT Pub. Date: Jul. 3, 2003

(65) Prior Publication Data

US 2005/0128668 A1 Jun. 16, 2005

(30) Foreign Application Priority Data

Dec. 21, 2001 (DE) ............... 101 63 566

(51) Int. Cl.
*H03K 3/00* (2006.01)
*H03K 3/64* (2006.01)

(52) U.S. Cl. .................................. 307/106
(58) Field of Classification Search ............... 307/106
See application file for complete search history.

(56) References Cited

U.S. PATENT DOCUMENTS 6,003,385 A * 12/1999 De Vanssay et al. .... 73/861.25
6,044,714 A * 4/2000 Lowell et al. .......... 73/861.28

* cited by examiner

*Primary Examiner*—Chau N. Nguyen
*Assistant Examiner*—Calos Amaya
(74) *Attorney, Agent, or Firm*—Bacon & Thomas

(57) ABSTRACT

A pulse generator including a control logic operating, by control pulses, a switch connected on the input side with a voltage supply unit and delivering a pulse voltage on the output side, there is connected, between control logic and the switch, a capacitor, which decreases the pulse voltage when the pulse frequencies are too low, and, additionally, arranged between voltage supply unit and switch, an RC-member, which decreases the pulse voltages when the repetition rates of the control pulses are too high, in order to enable use of the pulse generator in the explosion-protected area.

7 Claims, 5 Drawing Sheets

PULSE GENERATOR FOR AN ULTRASOUND FLOWMETER

FIELD OF THE INVENTION

The invention relates to a pulse generator comprising a control logic, which drives by means of control pulses a switch, which is connected on the input side with a voltage supply unit and delivers a pulse voltage on the output side.

BACKGROUND OF THE INVENTION

Such pulse generators are used in many applications in the field of process automation with reference to its applications of ultrasonics and radar.

Thus, the ultrasonic flow measuring devices permit, in a simple manner, contact-less determination of volume flow rate in a pipeline.

The known ultrasonic flow measuring devices work either on the basis of the Doppler principle or the travel time difference principle.

In the case of the travel time difference principle, the different travel times of ultrasonic pulses are evaluated relative to the flow direction of the liquid.

For this purpose, ultrasonic pulses are transmitted both in the direction of flow and opposite thereto. From the travel time difference, the flow velocity can be determined, and, with known diameter of the pipeline cross section, the volume flow rate.

In the case of the Doppler principle, ultrasonic waves of known frequency are coupled into the liquid, and the ultrasonic waves reflected by the liquid are evaluated. From the frequency shift between the waves coupled in, and those reflected, one can likewise determine the flow velocity of the liquid.

Reflections in the liquid occur, however, only when air bubbles or impurities are present therein, so that this principle finds use mainly in the case of contaminated liquids.

The ultrasonic waves are produced, or received, as the case may be, with the help of so-called ultrasonic transducers. For this purpose, ultrasonic transducers are placed securely on the pipe wall of the pipeline section of concern. More recently, clamp-on ultrasonic measuring systems are also obtainable. In the case of these systems, the ultrasonic transducers are held against the tube wall using only a clamp fastener. Such systems are known e.g. from EP-B-686 255, and from U.S. Pat. Nos. 4,484,478 and 4,598,593.

Another ultrasonic flow measuring device, which works on the basis of the travel time difference, is known from U.S. Pat. No. 5,052,230. The travel time in this case is determined using bursts, i.e. short ultrasonic pulses.

The ultrasonic transducers are usually made of a piezoelement and a coupling wedge. Ultrasonic waves are produced in the piezoelement and guided by way of the coupling wedge to the pipe wall, and, from there, into the liquid. Since the sound velocities in liquids and plastics are different, the ultrasonic waves are refracted at the transition from one medium to the other. The refraction angle is determined by Snell's law. The refraction angle is, consequently, dependent on the ratio of the propagation velocities in the two media.

Often, ultrasonic flow measuring devices are used in explosion-protected areas. In these areas, ignitable gases are present, whose ignition is to be avoided. For explosion-protected areas, there are corresponding safety specifications, in order to prevent endangerment of plant and persons. An ignition of the gases can happen, when certain values of outwardly-acting voltage, current, inductance or capacitance are exceeded and, consequently, sufficient energy is introduced into the gas, that an ignition process is triggered. High pulse-voltages are needed to get a sufficient measurement accuracy. With small pulse-voltages, signal evaluation becomes extremely difficult. Ex-areas are divided in the known safety standard into different zones, which are governed by different safety criteria. In the case of malfunctions of the control logic that governs the production of the voltage pulses, it is not out of the question that the number of the pulse periods per burst will become too large, the pulse frequency too high, or the burst repetition rate too high. All of these cases can lead to a gas ignition. The situation, wherein the voltage of the voltage supply unit is always at the output, must likewise be prevented.

An object of the present invention is, therefore, to provide a pulse generator suited especially for ultrasonic flow measuring devices and also permitting a safe application in Ex-areas.

This object is achieved by a pulse generator with at least one capacitor between the control logic and the switch, which decreases the pulse voltage when the pulse frequency of the control pulses is too small, and between the voltage control unit and the switch, an RC-member is arranged, which decreases the pulse voltages, when the repetition rate of the control pulses is to high.

SUMMARY OF THE INVENTION

An essential idea of the invention is to arrange the RC-member between the voltage supply unit and the switch, in order to decrease the pulse voltage, when the switch is driven at a too high repetition rate, and to arrange a capacitor between the control logic and the switch, in order to decrease the pulse voltage in the case where the pulse frequencies of the control pulses are too low.

The invention will now be explained in greater detail on the basis of an example of an embodiment presented in the drawings, whose figures show as follows:

DESCRIPTION OF THE PREFERRED EMBODIMENTS

Figure 1:
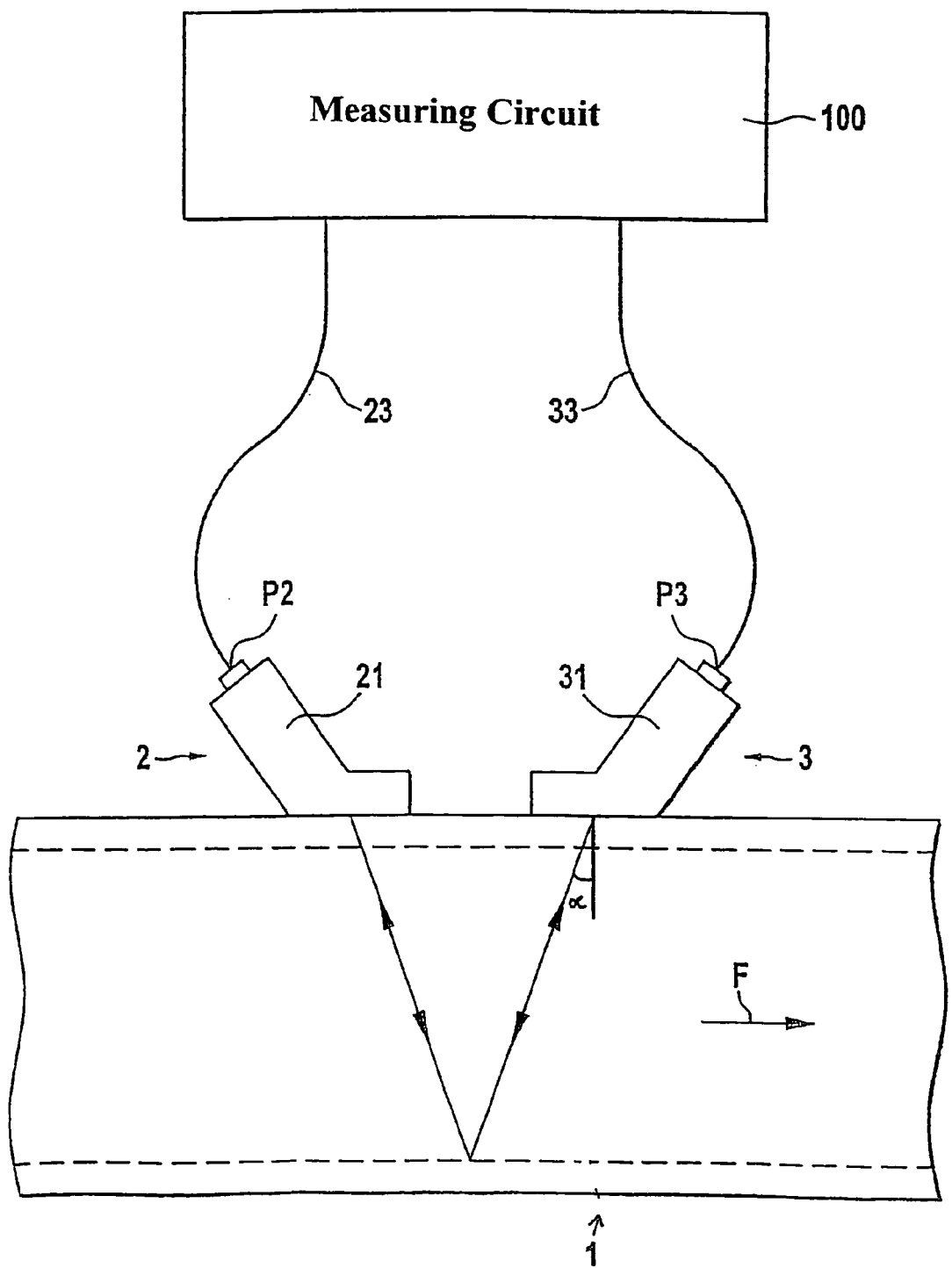
FIG. 1 is a schematic drawing of an ultrasonic flow measuring device.

FIG. 1 shows, in greatly simplified manner, an ultrasonic flow measuring device possessing two ultrasonic transducers 2, 3, which are arranged axially-parallel and displaced from one another on the outer wall of a pipeline 1. The liquid F in the pipeline 1 is flowing in the direction of the arrow.

This transducer pair can be operated in two different ways. Either the ultrasonic transducer 2 acts as transmitting transducer and the ultrasonic transducer 3 as the receiving transducer, or the ultrasonic transducer 2 as the receiving transducer and the ultrasonic transducer 3 as the transmitting transducer, so that, alternatingly, measurement is in the flow direction or opposite to the flow direction.

Each ultrasonic transducer 2, 3 is composed of a piezoelement P2, P3 and a coupling element 21, 31, which either couples the ultrasonic signals at an angle á less than 90-degrees into or out of the wall of the pipeline. The angle á is chosen such that as flat an angle as possible is obtained in the medium while simultaneously being able to couple the ultrasound into as many pipe materials as possible without total reflection.

The piezoelements P2, P3 transduce either ultrasonic pulses into mechanical oscillations, which are the actual ultrasonic signals, or the reverse, mechanical oscillations into electrical oscillations.

Both ultrasonic transducers 2, 3 are connected over leads 23, 33 with a measuring circuit 100, which includes a pulse generator. The electrical pulses are fed over the leads 23, 33.

Figure 2:
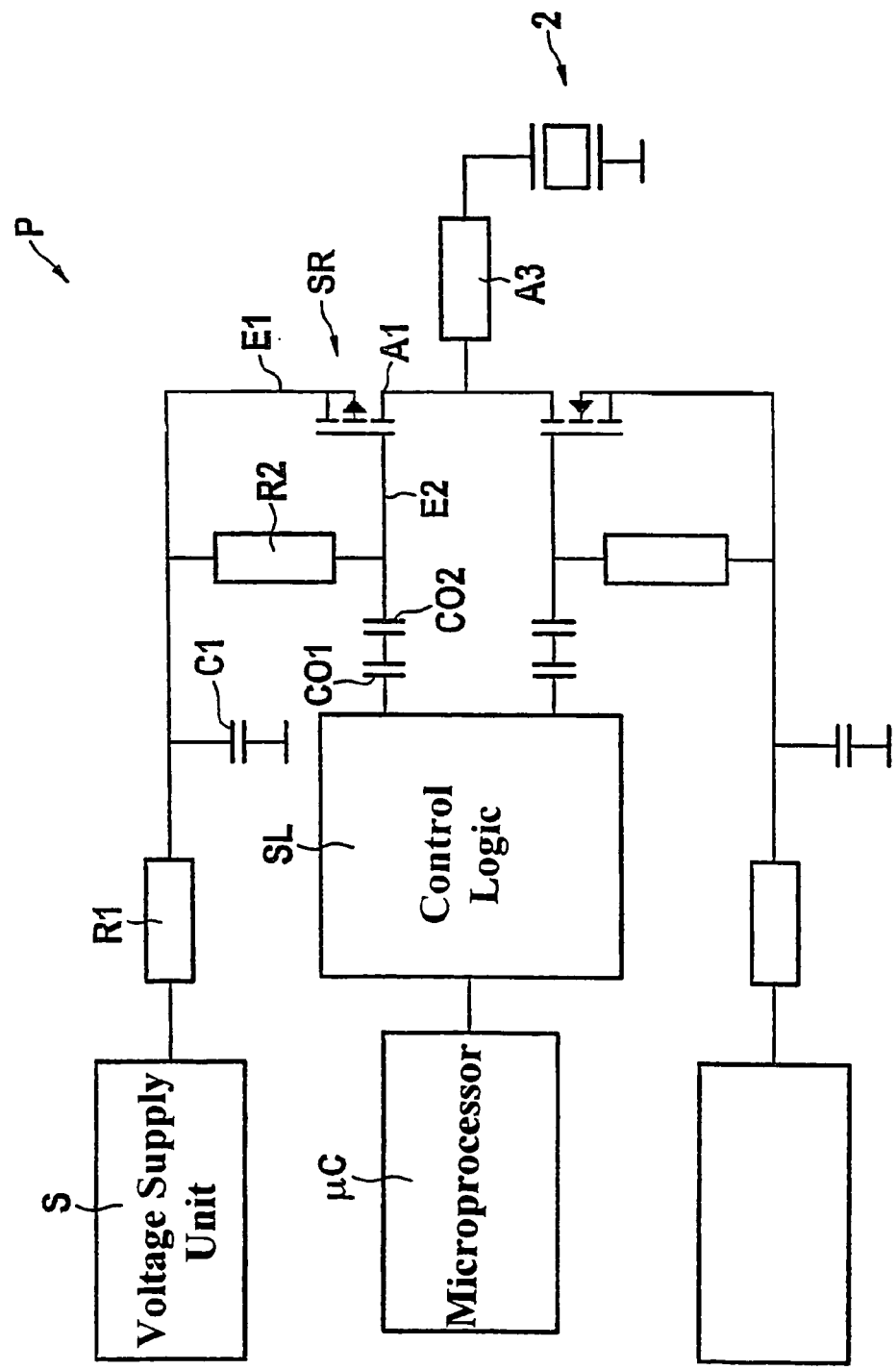
FIG. 2 is a schematic circuit diagram of a pulse generator of the invention for ultrasonic flow measuring devices.

The voltage pulses, with which the piezoelements are driven, are produced with the help of a pulse generator P, which essentially comprises a control logic SL, a switch SR and a voltage supply unit S (FIG. 2). The control logic SL delivers the control signals which operate the switch SR. The voltage pulses are produced by closing and opening of the switch SR. The amplitude of the pulse voltage is determined in normal operating condition by the output voltage of the voltage supply unit S.

The control logic permits setting of the number of periods per burst, and the pulse frequency and the repetition rate of the bursts. These settings are variable and stored in a data record in the control logic SL. The settings can be changed with the help of a microprocessor µC.

The voltage supply unit S is connected, by way of an RC-member composed of a resistance R1 and a capacitor C1, with an input E1 of a field effect transistor (FET), which serves as the switch SR. The control logic SL is also connected with the field effect transistor (FET), at its second input E2, via two capacitors C01 and C02. The output A1 of the field effect transistor FET is connected over a resistance A3, with the ultrasonic transducer 2. The ultrasonic transducer 2 is composed essentially of a piezoelement, which is in circuit with additional, passive or active components (resistances, inductances, diodes). The control logic SL is driven by the microprocessor µC. Since the pulse generator P produces bipolar voltage pulses, the upper part of the circuit is mirrored below.

The operation of the invention will now be explained in more detail.

Figure 3A:
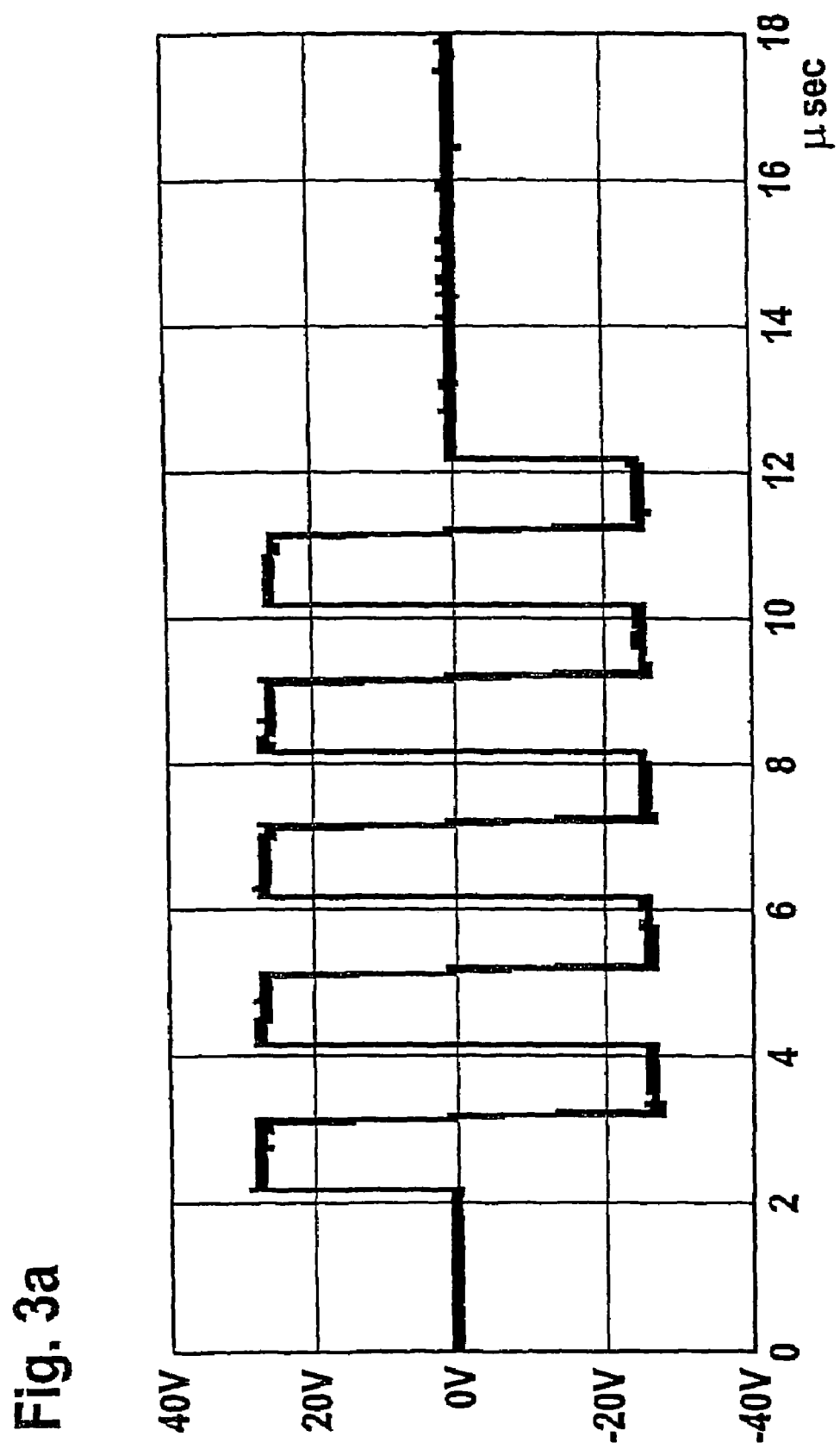
FIGS. 3a, 3b, 3c, are pulse-voltage versus time diagrams for different behaviors of the control logic.

The control logic SL delivers the control pulses which operate the switch SR. The control logic SL is normally adjusted such that the voltage pulses are produced as bursts of repetition rate 1–10 milliseconds and pulse frequency of some hundreds of kilohertz. FIG. 3a shows a corresponding pulse-voltage versus time diagram. The pulse frequency is here 500 kilohertz. A burst has 5 pulses, and the repetition rate of the bursts is 5 milliseconds, The amplitude of the pulse voltage lies at 30 volts, which is the output voltage of the voltage supply unit S.

Figure 3B:
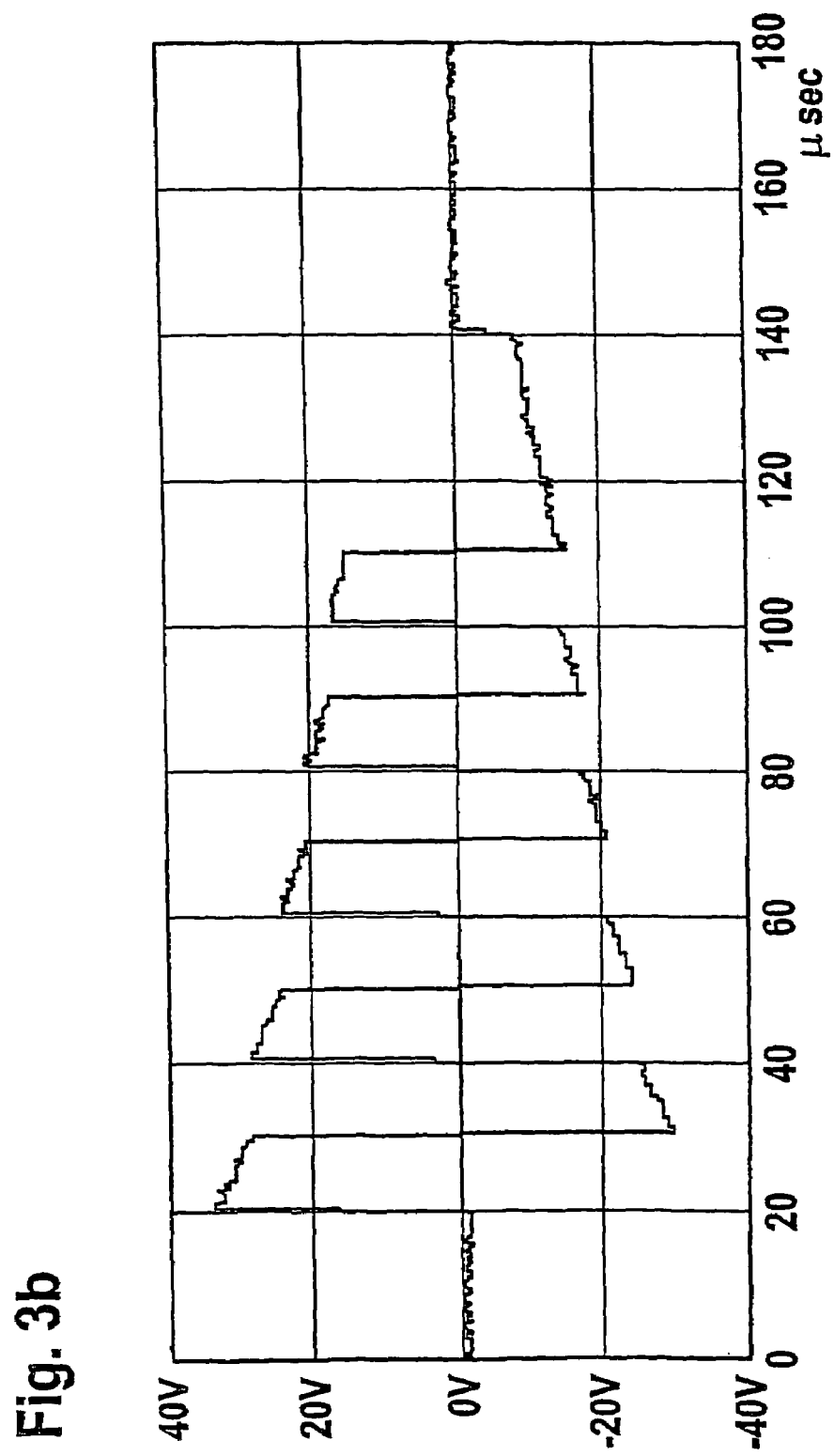

A possible malfunction of the control logic SL can lead to the pulse frequency being too small. Such a case is shown in FIG. 3b, where the pulse frequency amounts to only 50 kilohertz. Clearly evident is that the amplitude of the pulse voltage declines sharply with each individual pulse. Already after 5 pulses, the pulse voltage has decreased by more than half of the original starting value.

Figure 3C:
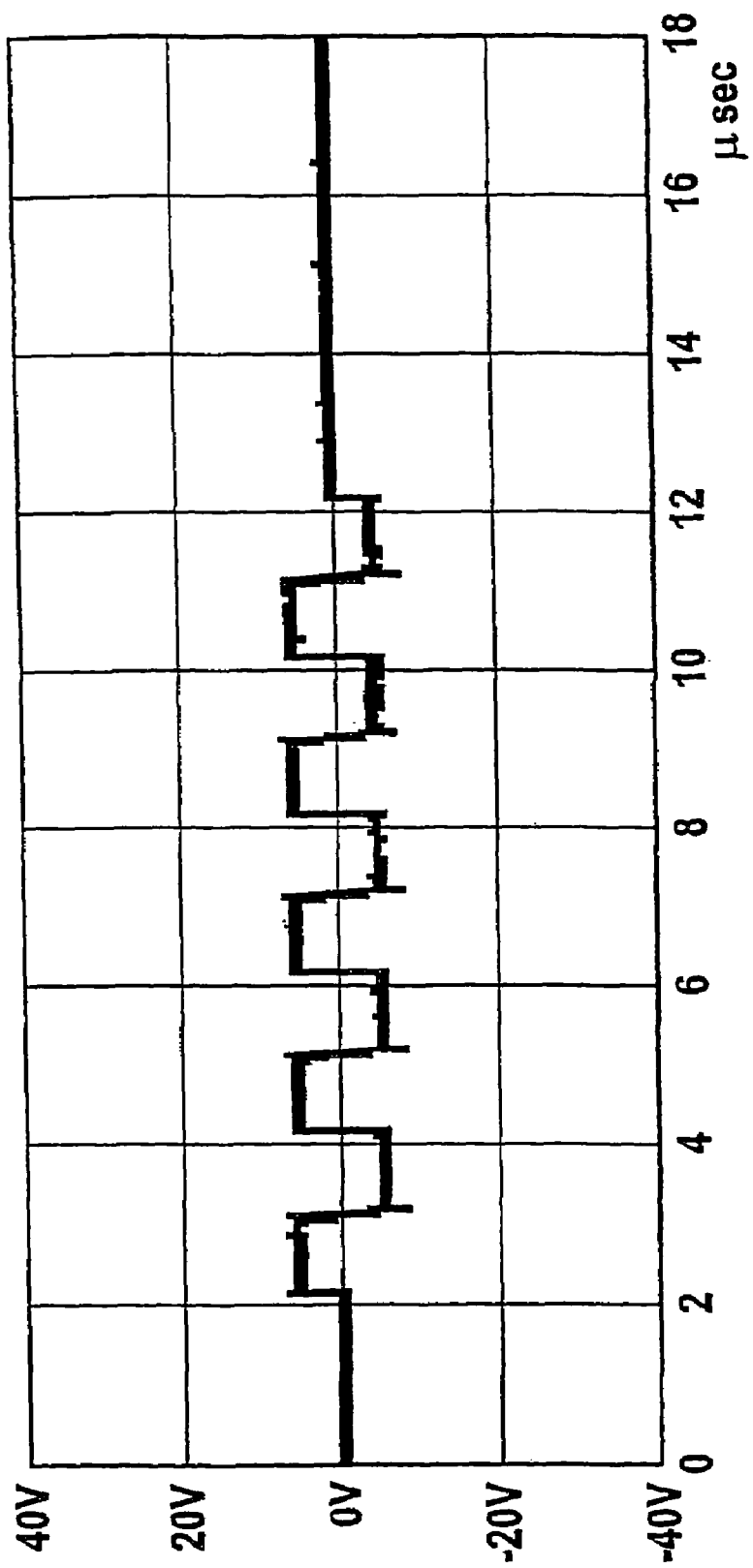

Another malfunction of the control logic SL can lead to the repetition rate being too high. Such a case is illustrated in FIG. 3c. Here, the repetition rate amounts to 100 microseconds. The amplitude of the pulse voltage lies now only at about 5 volts.

With the help of the pulse generator of the invention, despite the case of a malfunction of the control logic SL, a safe operation is possible even in explosion-protected areas.

The pulse generator of the invention can be applied in a multiplicity of ways, not only in the ultrasonic region, but also in the radar region, etc.

The invention claimed is:

1. A pulse generator comprising:
   a switch;
   a voltage supply unit connected to the input side of said switch;
   a control logic, which drives by means of control pulses said switch, said switch delivers a pulse voltage on its output side;
   at least one capacitor located between said control logic and said switch, which decreases the pulse voltage when the pulse frequency of the control pulses is too small; and
   an R-C member located between said voltage supply unit and said switch, said RC-member said decreases the pulse voltages, when the repetition rate of the control pulses is too high.

2. For ultrasonic flow measuring devices, a pulse generator as claimed in claim 1, wherein:
   said switch is a field effect transistor.

3. The pulse generator as claimed in claim 1, wherein:
   said RC-member has a time-constant making an ignition impossible.

4. The pulse generator as claimed in claim 1, wherein:
   two capacitors are provided which are connected in series.

5. The pulse generator as claimed in claim 1, further comprising:
   a current-limiting output resistance connected after said switch.

6. A pulse generator as claimed in claim 1, wherein:
   bipolar voltage pulses are produced.

7. A pulse generator as claimed in claim 1, wherein:
   it is applied for ultrasonic flow measuring devices.

* * * * *